US012577112B2

(12) United States Patent
Fini et al.

(10) Patent No.: US 12,577,112 B2
(45) Date of Patent: Mar. 17, 2026

(54) CARBON FIBER MATERIALS FROM WASTE POLYETHYLENE AND POLYETHYLENE OIL

(71) Applicants: Elham Fini, Phoenix, AZ (US); Albert Hung, Tempe, AZ (US)

(72) Inventors: Elham Fini, Phoenix, AZ (US); Albert Hung, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 482 days.

(21) Appl. No.: 18/187,493

(22) Filed: Mar. 21, 2023

(65) Prior Publication Data

US 2023/0294995 A1 Sep. 21, 2023

Related U.S. Application Data

(60) Provisional application No. 63/322,186, filed on Mar. 21, 2022.

(51) Int. Cl.
*C01B 32/354* (2017.01)
*C01B 32/324* (2017.01)
*C08J 11/16* (2006.01)

(52) U.S. Cl.
CPC .......... *C01B 32/324* (2017.08); *C01B 32/382* (2017.08); *C08J 11/16* (2013.01)

(58) Field of Classification Search
CPC ....... C01B 32/324; C01B 32/382; C08J 11/16
See application file for complete search history.

(56) References Cited

U.S. PATENT DOCUMENTS

| | | | |
|---|---|---|---|
| 11,717,989 B2 | 8/2023 | Fini | |
| 11,827,564 B2 | 11/2023 | Burton | |
| 11,840,667 B2 * | 12/2023 | Deng | B01D 3/145 |
| 12,227,459 B2 | 2/2025 | Fini | |
| 2023/0022441 A1 | 1/2023 | Deng | |

OTHER PUBLICATIONS

Yildirir, Eyup, Jude A. Onwudili, and Paul T. Williams. "Recovery of carbon fibres and production of high quality fuel gas from the chemical recycling of carbon fibre reinforced plastic wastes." The Journal of Supercritical Fluids 92 (2014): 107-114.*

(Continued)

*Primary Examiner* — Richard M Rump

(74) *Attorney, Agent, or Firm* — Fish & Richardson P.C.

(57) ABSTRACT

In one aspect, manufacturing carbon fiber materials includes combining waste plastic with waste polyethylene oil to yield infused waste plastic, combining the infused waste plastic with sulfuric acid to yield a mixture, irradiating the mixture with microwave radiation to yield sulfonated waste plastic, and carbonizing the sulfonated waste plastic to yield the carbon fiber materials. In another aspect, manufacturing carbon fiber materials includes combining waste polyethylene oil with sulfuric acid to yield a mixture, combining the mixture with waste plastic to yield infused waste plastic, irradiating the infused waste plastic with microwave radiation to yield sulfonated waste plastic, and carbonizing the sulfonated waste plastic to yield the carbon fiber materials.

23 Claims, 2 Drawing Sheets

(56)                 References Cited

OTHER PUBLICATIONS

Aldagari, Sand, et al. "Investigating aging properties of bitumen modified with polyethylene-terephthalate waste plastic." Resources, Conservation and Recycling 173 (2021): 105687.

Aldosari, Salem Mohammed, et al. "Manufacturing pitch and polyethylene blends-based fibres as potential carbon fibre precursors." Polymers 13.9 (2021): 1445.

Bhatt, Pooja, and Alka Goe. "Carbon fibres: production, properties and potential use." Mater. Sci. Res. India 14.1 (2017): 52-57.

Borrelle, Stephanie B., et al. "Predicted growth in plastic waste exceeds efforts to mitigate plastic pollution." Science 369.6510 (2020): 1515-1518.

Chandrasekaran, Sriraam R., et al. "Materials and energy recovery from e-waste plastics." ACS Sustainable Chemistry & Engineering 6.4 (2018): 4594-4602.

Chen, Wan-Ting, et al. "Use of supercritical water for the liquefaction of polypropylene into oil." ACS Sustainable Chemistry & Engineering 7.4 (2019): 3749-3758.

Ciuffi, Benedetta, et al. "Towards a better understanding of the HTL process of lignin-rich feedstock." Scientific Reports 11.1 (2021): 15504.

Dandamudi, Kodanda Phani Raj, et al. "Production of functionalized carbon from synergistic hydrothermal liquefaction of microalgae and swine manure." Resources, Conservation and Recycling 170 (2021): 105564.

Dandamudi, Kodanda Phani Raj, et al. "Co-liquefaction of mixed culture microalgal strains under sub-critical water conditions." Bioresource technology 236 (2017): 129-137.

Dandamudi, Kodanda Phani Raj, et al. "Hydrothermal liquefaction of Cyanidioschyzon merolae and Salicornia bigelovii Torr.: The interaction effect on product distribution and chemistry." Fuel 277 (2020): 118146.

Datta, Janusz, et al. "Thermo-chemical decomposition study of polyurethane elastomer through glycerolysis route with using crude and refined glycerine as a transesterification agent." Journal of Polymers and the Environment 26 (2018): 166-174.

Dimitriadis, Athanasios, and Stella Bezergianni. "Hydrothermal liquefaction of various biomass and waste feedstocks for biocrude production: A state of the art review." Renewable and Sustainable Energy Reviews 68 (2017): 113-125.

Ding, Qi, et al. "Exploiting equilibrium-kinetic synergetic effect for separation of ethylene and ethane in a microporous metal-organic framework." Science Advances 6.15 (2020): eaaz4322.

Donnet, J. B., et al. "Carbon Fibers," (2001): 431-455.

Dos Passos, et al. "Screening of common synthetic polymers for depolymerization by subcritical hydrothermal liquefaction." Process Safety and Environmental Protection 139 (2020): 371-379.

United States Environmental Protection Agency, "Advancing Sustainable Materials Management: 2013 Fact Sheet," Assessing Trends in Material Generation, Recycling and Disposal in the United States, Jun. 2015, 22 pages.

United States Environmental Protection Agency, "Advancing Sustainable Materials Management: 2015 Fact Sheet," Assessing Trends in Material Generation, Recycling, Composting, Combustion with Energy Recovery and Landfilling in the United States, Jul. 2018, 23 pages.

Frank, Erik, et al. "Carbon fibers: precursor systems, processing, structure, and properties." Angewandte Chemie International Edition 53.21 (2014): 5262-5298.

Garcia, Jeannette M., and Megan L. Robertson. "The future of plastics recycling." Science 358.6365 (2017): 870-872.

Geyer, R.; Jambeck, J. R.; Law, K. L., Production, use, and fate of all plastics ever made. Science Advances 2017, 3, e1700782, 6 pages, DOI: 10.1126/sciadv.1700782.

Ghasemi, Hamid, et al. "Toward carbon-negative and emission-curbing roads to drive environmental health." ACS Sustainable Chemistry & Engineering 10.5 (2022): 1857-1862.

Goto, Motonobu, et al. "Reactions of polymers in supercritical fluids for chemical recycling of waste plastics." Journal of Materials science 41 (2006): 1509-1515.

Pedersen, Thomas Helmer, and Federica Conti. "Improving the circular economy via hydrothermal processing of high-density waste plastics." Waste management 68 (2017): 24-31.

Høgsaa, Bjarke, et al. "A novel bioresidue to compatibilize sodium montmorillonite and linear low density polyethylene." Industrial & Engineering Chemistry Research 57.4 (2018): 1213-1224.

Høgsaa, Bjarke, et al. "Multiscale characterization of a wood-based biocrude as a green compatibilizing agent for high-impact polystyrene/halloysite nanotube nanocomposites." ACS omega 4.22 (2019): 19934-19943.

Hung, A. M., Kazembeyki, M., Hoover, C. G., & Fini, E. H. (2019). Evolution of morphological and nanomechanical properties of bitumen thin films as a result of compositional changes due to ultraviolet radiation. ACS Sustainable Chemistry & Engineering, 7(21), 18005-18014.

Hung, Albert, and Elham H. Fini. "Surface morphology and chemical mapping of UV-aged thin films of bitumen." ACS Sustainable Chemistry & Engineering 8.31 (2020): 11764-11771.

Hunt, Marcus A., et al. "Patterned functional carbon fibers from polyethylene." Advanced materials (Deerfield Beach, Fla.) 24.18 (2012): 2386-2389.

Hwang, Gyou Cheol, et al. "Degradation of high density polyethylene, polypropylene and their mixtures in supercritical acetone." Korean Journal of Chemical Engineering 18 (2001): 396-401.

Ignatyev, Igor A., et al. "Recycling of polymers: a review." ChemSusChem 7.6 (2014): 1579-1593.

Jambeck, J. R.; Geyer, R.; Wilcox, C.; Siegler, T. R.; Perryman, M.; Andrady, A.; Narayan, R.; Law, K. L., Plastic waste inputs from land into the ocean. Science 2015, 347, 768-771, DOI: 10.1126/science.1260352.

Jan, M. Rasul, et al. "Catalytic degradation of waste high-density polyethylene into fuel products using BaCO3 as a catalyst." Fuel processing technology 91.11 (2010): 1428-1437.

Jin, Kai, et al. "Conversion of polyethylene waste into clean fuels and waxes via hydrothermal processing (HTP)." Fuel 273 (2020): 117726.

Kabir, Sk Faisal, et al. "End of life plastics to enhance sustainability of pavement construction utilizing a hybrid treatment of bio-oil and carbon coating." Construction and Building Materials 278 (2021): 122444, pp. 1-12.

Karnati, Sidharth Reddy, et al. "Developing carbon nanoparticles with tunable morphology and surface chemistry for use in construction." Construction and Building Materials 262 (2020): 120780.

Kim, Kwan-Woo, et al. "Effects of cross-linking methods for polyethylene-based carbon fibers: review." Carbon letters 16.3 (2015): 147-170.

Lai, Jing-Qi, et al. "Enzymatic production of microalgal biodiesel in ionic liquid [BMIm][PF6]." Fuel 95 (2012): 329-333.

Lettieri, Paola, and Sultan M. Al-Salem. "Thermochemical treatment of plastic solid waste." Waste. Academic Press, 2011.

Levine, A. G., B. French, and S. Sanders. "125 questions: Exploration and Discovery." The American Association for the Advancement of Science: Washington, DC, USA (2021).

Liu, Yixin, et al. "Effective depolymerization of polyethylene plastic wastes under hydrothermal and solvothermal liquefaction conditions." Chemical Engineering Journal 446 (2022): 137238.

Lopez, Gartzen, et al. "Recent advances in the gasification of waste plastics. A critical overview." Renewable and Sustainable Energy Reviews 82 (2018): 576-596.

Lyu, Xilei, et al. "Simultaneous conversion of C5 and C6 sugars into methyl levulinate with the addition of 1, 3, 5-trioxane." ChemSusChem 12.19 (2019): 4400-4404.

May, D., et al. "Multifunctionality of polymer composites based on recycled carbon fibers: A review." Advanced Industrial and Engineering Polymer Research 4.2 (2021): 70-81.

Miandad, R., et al. "Catalytic pyrolysis of plastic waste: A review." Process Safety and Environmental Protection 102 (2016): 822-838.

Munir, Dureem, et al. "Hydrocracking of virgin and waste plastics: A detailed review." Renewable and Sustainable Energy Reviews 90 (2018): 490-515.

(56) References Cited

OTHER PUBLICATIONS

Muppaneni, Tapaswy, et al. "Hydrothermal liquefaction of Cyanidioschyzon merolae and the influence of catalysts on products." Bioresource technology 223 (2017): 91-97.

Niu, Bo, et al. "Recovery of tantalum from waste tantalum capacitors by supercritical water treatment." ACS Sustainable Chemistry & Engineering 5.5 (2017): 4421-4428.

Nizami, A. S., et al. "Developing waste biorefinery in Makkah: a way forward to convert urban waste into renewable energy." Applied Energy 186 (2017): 189-196.

Okajima, I., et al. "Chemical Recycling of Carbon Fiber Reinforced Plastic with Supercritical Alcohol." ISFR, 2012, Abstract, 2 pages.

Okajima, Idzumi, et al. "Chemical recycling of carbon fiber reinforced plastic using supercritical methanol." The journal of supercritical fluids 91 (2014): 68-76.

Okan, Meltem, et al. "Current approaches to waste polymer utilization and minimization: a review." Journal of Chemical Technology & Biotechnology 94.1 (2019): 8-21.

Perkins, Greg, et al. "Recent advances in liquefaction technologies for production of liquid hydrocarbon fuels from biomass and carbonaceous wastes." Renewable and Sustainable Energy Reviews 115 (2019): 109400.

Qureshi, Muhammad Saad, et al. "Pyrolysis of plastic waste: Opportunities and challenges." Journal of Analytical and Applied Pyrolysis 152 (2020): 104804.

Radhakrishnan, Rokesh, et al. "Recent advancements in the ionic liquid mediated lignin valorization for the production of renewable materials and value-added chemicals." Renewable and Sustainable Energy Reviews 149 (2021): 111368.

Rajib, Amirul, et al. "Weathering Mechanisms in Bitumen Modified with Polyphosphoric Acid." Journal of Materials in Civil Engineering 33.7 (2021): 04021154.

H. K. Reddy et al., "Temperature effect on hydrothermal liquefaction of Nannochloropsis gaditana and Chlorella sp.," Appl. Energy, vol. 165, 943-951, 2016, doi: 10.1016/j.apenergy.2015.11.067.

Ritchie, H. et al. "Plastic Pollution," Our World in Data, printed Jul. 25, 2024, 6 pages.

Roberts, Virginia M., et al. "Towards quantitative catalytic lignin depolymerization." Chemistry—A European Journal 17.21 (2011): 5939-5948.

Roy, Pallabi Sinha, et al. "Strategic approach towards plastic waste valorization: challenges and promising chemical upcycling possibilities." ChemSusChem 14.19 (2021): 4007-4027.

Seshasayee, Mahadevan Subramanya, and Phillip E. Savage. "Oil from plastic via hydrothermal liquefaction: Production and characterization." Applied Energy 278 (2020): 115673.

Sharuddin, Shafferina Dayana Anuar, et al. "A review on pyrolysis of plastic wastes." Energy conversion and management 115 (2016): 308-326.

Singh, Sandip K., and Paresh L. Dhepe. "Ionic liquids catalyzed lignin liquefaction: mechanistic studies using TPO-MS, FT-IR, RAMAN and 1D, 2D-HSQC/NOSEY NMR." Green Chemistry 18.14 (2016): 4098-4108.

Statista, "Annual production of plastics worldwide from 1950-2022 (in million metric tons)," 2024, 1 page.

Sun, Peiqin, et al. "Direct liquefaction of paulownia in hot compressed water: Influence of catalysts." Energy 35.12 (2010): 5421-5429.

Toor, Saqib S., et al. "Hydrothermal liquefaction of Spirulina and Nannochloropsis salina under subcritical and supercritical water conditions." Bioresource technology 131 (2013): 413-419.

Verma, Rinku, et al. "Toxic pollutants from plastic waste—a review." Procedia Environmental Sciences 35 (2016): 701-708.

Wang, Yanmin, et al. "Degradation of brominated flame retardant in computer housing plastic by supercritical fluids." Journal of hazardous materials 205 (2012): 156-163.

Wang, Jun, et al. "Optimizing pore space for flexible-robust metal-organic framework to boost trace acetylene removal." Journal of the American Chemical Society 142.21 (2020): 9744-9751.

Watanabe, Masaru, et al. "Polyethylene conversion in supercritical water." The Journal of supercritical fluids 13.1-3 (1998): 247-252.

Yang, Xiaoning, et al. "Pyrolysis and dehalogenation of plastics from waste electrical and electronic equipment (WEEE): A review." Waste management 33.2 (2013): 462-473.

Yang, Jiangfeng, et al. "Improved synthesis of trigone trimer cluster metal organic framework MIL-100Al by a later entry of methyl groups." Chemical Communications 52.4 (2016): 725-728.

Yong, Tau Len-Kelly, and Yukihiko Matsumura. "Kinetic analysis of lignin hydrothermal conversion in sub-and supercritical water." Industrial & Engineering Chemistry Research 52.16 (2013): 5626-5639.

Zeng, Xianlai, et al. "Urban mining of e-waste is becoming more cost-effective than virgin mining." Environmental science & technology 52.8 (2018): 4835-4841.

Zhao, Xuyuan, et al. "Hydrothermal treatment of e-waste plastics for tertiary recycling: product slate and decomposition mechanisms." ACS Sustainable Chemistry & Engineering 7.1 (2018): 1464-1473.

Zhao, Peitao, et al. "Product characteristics and synergy study on supercritical methanol liquefaction of lignocellulosic biomass and plastic." ACS Sustainable Chemistry & Engineering 9.50 (2021): 17103-17111.

Aldosari, S. M.; Khan, M.; Rahatekar, S., Manufacturing carbon fibres from pitch and polyethylene blend precursors: a review. Journal of Materials Research and Technology 2020, 9, 7786-7806, DOI: https://doi.org/10.1016/j.jmrt.2020.05.037.

* cited by examiner

CARBON FIBER MATERIALS FROM WASTE POLYETHYLENE AND POLYETHYLENE OIL

CROSS-REFERENCE TO RELATED APPLICATION

This application claims the benefit of U.S. Patent Application 63/322,186 filed on Mar. 21, 2022, which is incorporated herein by reference in its entirety.

TECHNICAL FIELD

This invention relates to manufacturing of carbon fiber materials from waste polyolefins and polyethylene oil, as well as the resulting carbon fiber materials.

BACKGROUND

Millions of tons of plastic waste are generated globally each year, most of which is discarded rather than recycled or incinerated. Advancement to a circular economy can be promoted by efficient methods for upcycling of plastics into valuable products or tertiary recycling (also known as chemical or feedstock recycling) of plastics into monomers or other chemical feedstocks. Polyethylene is the most extensively used category of plastic. Polyethylene can be recycled via pyrolysis, hydrogenolysis, or other processes that "crack" the polymer into liquid fuels or other valuable, low molecular weight products. Depolymerization of polyethylene is one of the most challenging tasks in chemical recycling or upcycling of polyethylene-based plastic wastes, generally because the disassociation of the stable carbon-carbon bonds in polyethylene is typically only possible at a very high reaction temperature.

SUMMARY

This disclosure describes carbon fiber materials and methods of manufacturing the carbon fiber materials from waste plastic, such as polyolefins (e.g., high density polyethylene (HDPE), low density polyethylene (LDPE), and polypropylene (PP)). The waste plastic is combined with waste polyethylene oil from solvothermal liquefaction of other polyolefin-based polymers that is further sulfonated with sulfuric acid and treated with microwave radiation. The oil provides a microwave-absorptive medium to promote sulfonation of the waste plastic. The sulfonated plastics are then carbonized to form carbon fiber materials. Sulfonation of the waste plastics promotes cross-linking during the carbonization process. Disclosed are processes for incorporating HDPE, LDPE, or both with polyethylene oil and for stabilizing the blend. Strategies include: blending or swelling the plastic with waste polyethylene oil to accelerate stabilization in sulfuric acid, and sulfonating the polyethylene oil directly to make it a cross-linking additive that enables the plastic to be carbonized without additional stabilization.

In a first general aspect, manufacturing carbon fiber materials includes combining waste plastic with waste polyethylene oil to yield infused waste plastic, combining the infused wasted plastic with sulfuric acid to yield a mixture, irradiating the mixture with microwave radiation to yield sulfonated waste plastic, and carbonizing the sulfonated waste plastic to yield the carbon fiber materials.

Implementations of the first general aspect can include one or more of the following features.

In some cases, the waste polyethylene oil is chemically heterogeneous. The waste polyethylene oil can be prepared by solvothermal liquefaction. In some implementations, the solvothermal liquefaction includes combining waste plastic with a solvent to form a mixture, and heating the mixture. In some cases, the first general aspect further includes heating the mixture under pressure in a range of about 20 MPa to about 25 MPa. In some implementations, the solvent includes one or more of acetone, alcohol, nitric acid, and water. The waste plastic can include polyolefins. In some cases, the polyolefins include high density polyethylene, low density polyethylene, polypropylene, or a combination thereof. In some implementations, irradiating the mixture with the microwave radiation includes heating the mixture to a temperature of at least 100° C. Irradiating the mixture with the microwave radiation can include heating the mixture to a temperature in a range between 100° C. and 200° C. In some cases, irradiating the mixture with the microwave radiation includes heating the mixture to a temperature in a range between 150° C. and 200° C. The infused waste plastic can include between 5 wt % and 15 wt % of the waste polyethylene oil. In some cases, carbonizing the sulfonated waste plastic includes heating the sulfonated waste plastic to a temperature of at least 750° C.

In a second general aspect, manufacturing carbon fiber materials includes combining waste polyethylene oil with sulfuric acid to yield a mixture, combining the mixture with waste plastic to yield infused waste plastic, irradiating the infused waste plastic with microwave radiation to yield sulfonated waste plastic, and carbonizing the sulfonated waste plastic to yield the carbon fiber materials.

Implementations of the second general aspect can include one or more of the following features.

The waste polyethylene oil can be chemically heterogeneous. In some cases, the waste polyethylene oil is made by solvothermal liquefaction of waste plastic. In some implementations, the waste plastic includes polyolefins. In some cases, the polyolefins include high density polyethylene, low density polyethylene, polypropylene, or a combination thereof. Irradiating the infused waste plastic with the microwave radiation can include heating the infused waste plastic to a temperature of at least 100° C. In some cases, irradiating the infused waste plastic with the microwave radiation includes heating the infused waste plastic to a temperature in a range between 100° C. and 200° C. In some implementations, irradiating the infused waste plastic with the microwave radiation includes heating the infused waste plastic to a temperature in a range between 150° C. and 200° C. The infused waste plastic can include between 5 wt % and 15 wt % of the waste polyethylene oil. In some cases, carbonizing the sulfonated waste plastic includes heating the sulfonated waste plastic to a temperature of at least 750° C.

Third and fourth general aspects include carbon fiber materials produced by the first and second general aspects, respectively.

The disclosed process for manufacturing of carbon fiber materials can be achieved at lower temperatures, shorter times, and/or with less sulfuric acid than known methods, and can therefore be safer and more efficient. Compared to traditional reactors, microwave reactors used in the disclosed process are more energy efficient, have a more uniform heating profile (e.g., heat from the inside of the reaction vessel outwards), and achieve target temperatures at a faster rate. The process promotes chemical recycling and upcycling of waste plastics.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figures 1A, 1B, 1C, 1D:
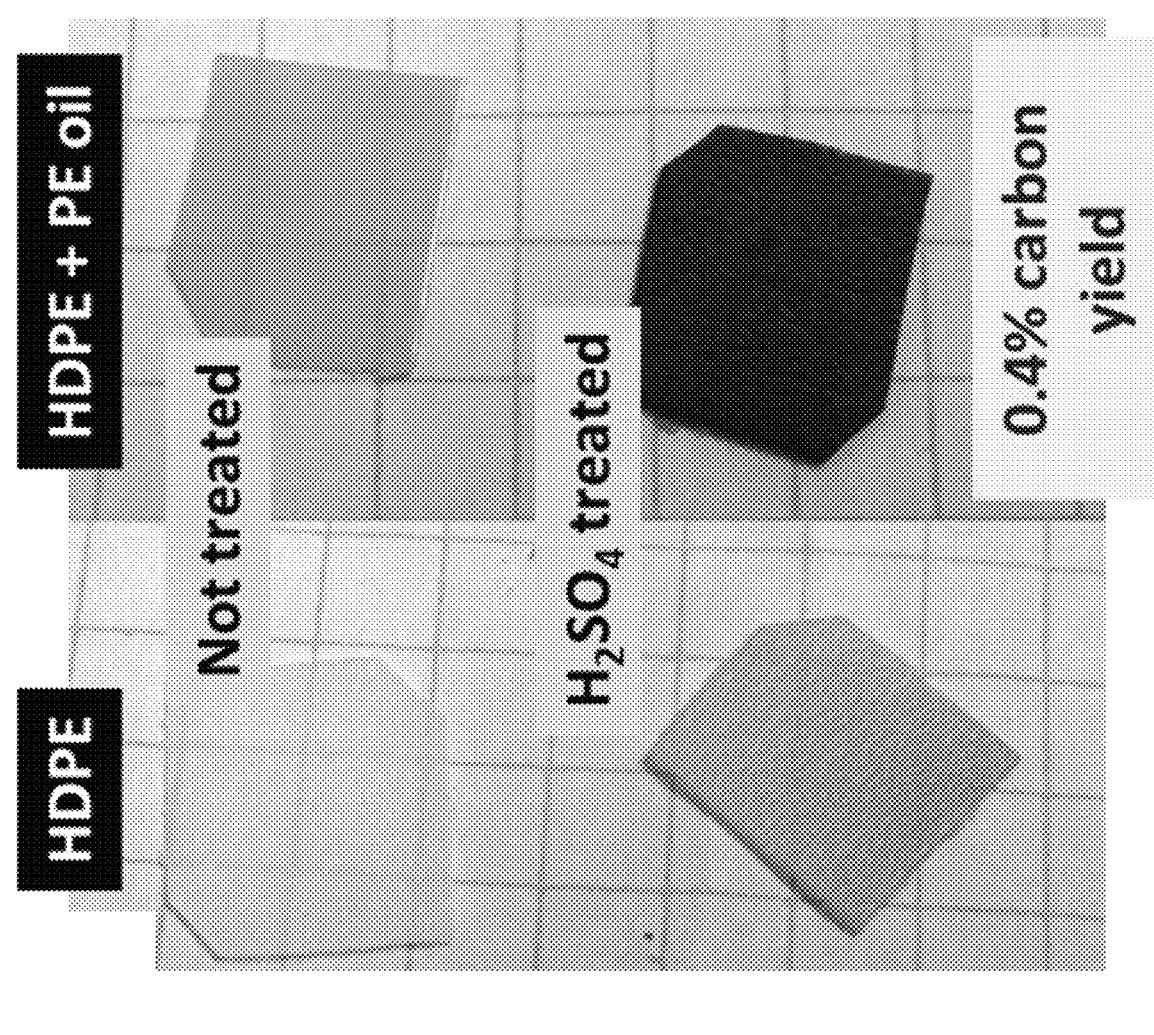
FIGS. 1A-1D show photographs of high density polyethylene (HDPE) samples. The samples in FIGS. 1A and 1C are not infused with waste polyethylene oil. The samples in FIGS. 1B and 1D are infused with waste polyethylene oil. The samples in FIGS. 1A and 1B are not treated with sulfuric acid. The samples in FIGS. 1C and 1D are treated with sulfuric acid.

This disclosure describes a safe and efficient process for synthesizing carbon fiber materials from waste or recycled plastic and polyethylene oil by a microwave assisted reaction. The method involves mixing the waste plastic with waste polyethylene oil recovered from plastic containing polyolefin-based polymers using solvothermal liquefaction. As used herein, "waste polyethylene oil" (or polyethylene residuum) refers to the liquid or semi-liquid product of solvothermal liquefaction of polyolefin-containing plastic. Waste polyethylene oil includes polyethylene oil, and can also include other components, based at least in part on the conditions and materials used in the solvothermal liquefaction process.

The synthesis of carbon fiber materials (including carbon fibers) from waste plastic includes a carbonization step in which the plastic is subjected to heat in the absence of oxygen. To inhibit or prevent melting of carbon fibers during this carbonization step, it is advantageous for the plastic to be stabilized by the formation intermolecular cross-links. The formation of these intermolecular cross-links can be promoted with a sulfonation reaction that includes microwave heating. The waste plastic is infused with waste polyethylene oil recovered using solvothermal liquefaction. In some cases, the waste polyethylene oil is treated with sulfuric acid before mixing. In certain cases, the waste polyethylene oil and waste plastic are treated with sulfuric acid after mixing. The sulfuric acid-treated combination of waste polyethylene oil and waste plastic is heated with microwave radiation to sulfonate the plastic polymers. Sulfonation of the polymers promotes the formation the cross-links that stabilize the carbon fibers formed during the carbonization process. The waste polyethylene oil is an effective microwave absorber. Infusion of the waste polyethylene oil at least partially swells the polymer, thus facilitating uniform and efficient microwave heating that increases the efficiency of the sulfonation reaction. In addition, depolymerized polyethylene in the waste polyethylene oil provides reactants for cross-linking reactions in the formation of carbon fibers during the carbonization process.

Solvothermal liquefaction is used to depolymerize cross-linked polyolefins (e.g., cross-linked polyethylene) in waste plastic into waste polyethylene oil. The solvothermal liquefaction process involves heating a mixture of waste plastic and one or more reactive solvents to break down the chemical bonds of the polymer matrix. The heating can be done in a range of about 70° C. to about 90° C. Suitable solvents include acetone, propanol, nitric acid, and benzyl alcohol. The process can include heating the waste plastic-solvent mixture under pressure to transform the solvent into a supercritical fluid. The pressure can be applied in a range of about 20 mMPa to about 25 MPa. The heating under pressure can be done in a range of about 350° C. to about 450° C. Suitable solvents for solvothermal liquefaction under pressure include water and alcohols.

In a first aspect, a method of manufacturing carbon fiber materials includes combining waste plastic and waste polyethylene oil to yield infused waste plastic. The waste plastic can include polyolefins. The polyolefins can include high density polyethylene (HDPE), low density polyethylene (LDPE), polypropylene (PP), or a combination thereof.

Waste polyethylene oil can be made by solvothermal liquefaction. Solvothermal liquefaction can include combining waste plastic with a solvent to form a mixture and heating the mixture. Solvothermal liquefaction can further include heating the mixture under pressure in a range of about 20 MPa to about 25 MPa. The solvents used in solvothermal liquefaction can include one or more of acetone, alcohol, nitric acid, and water. The waste polyethylene oil can be chemically heterogeneous. The infused waste plastic can include between 5 wt % and 15 wt % of the waste polyethylene oil.

The method further involves combining the infused waste plastic with sulfuric acid to yield a mixture. The mixture is irradiated with microwave radiation to yield sulfonated waste plastic. The microwave radiation can be used to heat the mixture to a temperature of at least 100° C., or in a range between 100° C. and 200° C., or between 150° C. and 200° C.

The sulfonated waste plastic is carbonized to yield the carbon fiber materials. Carbonizing the sulfonated waste plastic includes heating the sulfonated waste plastic to a temperature of at least 750° C.

In a second aspect, a method of manufacturing carbon fiber materials includes combining waste polyethylene oil with sulfuric acid to yield a mixture. The mixture is combined with waste plastic to yield infused waste plastic. The infused waste plastic is irradiated with microwave radiation to yield sulfonated waste plastic. The sulfonated waste plastic is carbononized to yield the carbon fiber materials.

The waste plastic can include polyolefins. The polyolefins can include high density polyethylene (HDPE), low density polyethylene (LDPE), polypropylene (PP), or a combination thereof.

Waste polyethylene oil can be made by solvothermal liquefaction. Solvothermal liquefaction can include combining waste plastic with a solvent to form a mixture and heating the mixture. Solvothermal liquefaction can further include heating the mixture under pressure in a range of about 20 MPa to about 25 MPa. The solvents used in solvothermal liquefaction can include one or more of acetone, alcohol, nitric acid, and water. The waste polyethylene oil can be chemically heterogeneous. The infused waste plastic can include between 5 wt % and 15 wt % of the waste polyethylene oil.

The method further involves combining the infused waste plastic with sulfuric acid to yield a mixture. The mixture is irradiated with microwave radiation to yield sulfonated waste plastic. The microwave radiation can be used to heat the mixture to a temperature of at least 100° C., or in a range between 100° C. and 200° C., or between 150° C. and 200° C.

The sulfonated waste plastic is carbonized to yield the carbon fiber materials. Carbonizing the sulfonated waste plastic includes heating the sulfonated waste plastic to a temperature of at least 750° C.

In a depolymerization of cross-linked polyethylene plastics collected from electrical cables using acetone as a solvent in a solvothermal process, about 75% of the plastics are converted into liquids and gaseous products, and 25% remains as a solid residue. To fully valorize the discarded plastic cables and minimize the environmental impacts of these underutilized resources, the remaining 25% can be valorized into a value-added application. In one example, carbon fiber is prepared from the solid residue and the resulting fibers are integrated in a fiber-reinforced polymer (FRP) composite.

A FRP composite includes a polymer matrix containing high-strength fibers. Incorporating fibers into a polymer matrix yields a reinforcing component that improves the properties when compared with those of virgin components. Formation of FRP composites includes recovery of carbon fibers and other chemicals through a two-step solvothermal decomposition of plastic cables by using acetone, propanol, and/or benzyl alcohol as solvents. The recovered fiber and chemicals can be characterized through thermogravimetric analysis, Fourier transform infrared spectroscopy, scanning electron microscopy, and elastic modulus. Carbon is produced from recovered solid/semi-liquid residue compounded with waste polyethylene, and carbon fibers are produced from the carbon. The carbon fibers can be evaluated for structural and mechanical properties.

Carbon fiber reinforced polymers (CFRPs) demonstrate properties such as lightweight, low thermal expansion, high fatigue resistance, and good corrosion resistance, thus increasing resource efficiency and reducing emissions. CFRPs are widely applied in the high technology sector such as aerospace and nuclear engineering, industrial and sports. However, each sector does not present the same interest in using carbon fibers. For instance, in aerospace and aircraft, choices of materials are driven by the material's performance and fuel efficiency. This makes the high stiffness and relatively low weight of carbon fibers a very attractive alternative. In general engineering and surface transportation, the use of carbon fibers is determined by cost constraints, high production rate requirements, and generally less critical performance needs.

Traditional high-strength carbon fiber is produced from carbonization of polyacrylonitrile. Carbon fiber can also be produce from less expensive precursors such as mesophase pitch, however they may be difficult to spin into fibers or make lower quality carbon fibers. Synthesizing carbon fiber from waste polyethylene could yield a valuable product at a lower cost than typical carbon-fiber synthesized from polyacrylonitrile. However, this typically requires stabilization of the polyethylene via cross-linking so that the carbon is retained, and the fibers don't melt during carbonization. Sulfonation of polyethylene by immersion in hot sulfuric acid is an effective method of achieving high cross-link density. Reducing the required time and temperature for sulfuric acid stabilization can improve energy efficiency and chemical safety. A solvolysis process for recovering liquid and semi-liquid polyethylene components that can be used for producing new carbon fibers is described, resulting in a safer and more efficient process for synthesizing carbon fiber from waste LD/HDPE by adding liquefied polyethylene (polyethylene residuum or polyethylene oil) in microwave-assisted reactions.

To synthesize carbon fiber from semi-solid component of a solvothermal reaction of polyethylene (which is nearly 25% of reaction products), microwave reactors are used. The purpose of the polyethylene residuum is to provide a microwave-absorptive medium, partially swell the polymer, and contribute cross-linking agents while also valorizing a waste plastic product. HDPE is more difficult to stabilize than LDPE, so any process that works for HDPE is also expected to work for LDPE.

Methods described herein include incorporating recovered solvothermal liquefaction components (polyethylene residuum) with LD/HDPE (also from waste sources) with the goal of reducing or eliminating the need to use hot, concentrated sulfuric acid to stabilize the blend for carbonation. In one approach, the waste plastics are compounded with 10-30 wt % polyethylene residuum, and a minimum time/temperature required to stabilize the blend in sulfuric acid is assessed. In another approach, the polyethylene residuum is directly sulfonated with minimal sulfuric acid first and then compounded with plastic for carbonation without additional stabilization. The resulting carbon materials are then characterized.

Carbon retention as measured by thermogravimetric analysis (TGA) can be used to characterize the carbon fiber materials. Chemical and morphological characterization can be performed using infrared spectroscopy (FTIR absorption and Raman scattering), scanning electron microscopy (SEM), and X-ray diffraction (XRD). The performance of different polyethylene oil formulations will be assessed. Sulfonation occurs most readily at tertiary carbons or around alkenes, so it may be beneficial to adjust the polyethylene oil composition accordingly.

EXAMPLES

Production of polyethylene oil. 5 g of waste plastic including linear low-density polyethylene (LLDPE), cross-linked polyethylene (XLPE), and carbon-doped cross-linked polyethylene is combined with 30 ml of solvent in a high-pressure reactor. The reactor is sealed and purged with high-purity nitrogen to create an inert environment for the reactants. Following the purging process, the initial pressure of 1.4 MPa nitrogen is maintained before the reaction started. The reaction residence time begins as soon as the temperature reaches the desired value. The reactor is cooled down to room temperature after the reaction is finished. An electric fan is used to speed up the cooling process, then the incondensable gases are collected by a gasbag, and the reactor is then opened. The contents (liquid, semi-liquid, and solid mixture) are then transferred to a glass separating funnel equipped with a dried and pre-weighed filter paper to separate the solid from other components, and the reactor, stirrer, and glassware are washed with 15 ml of dichloromethane to avoid product losses. The dichloromethane phase is separated and vaporized in a vacuum rotary evaporator at 35° C. to recover the oil. The solid fraction is dried in an oven at 80° C. for over 6 h. All the crude oil and liquid fractions are stored below 5° C. for further analysis.

Thermal liquefaction of plastic cables. A sample of plastic cables consisting of linear low-density polyethylene (LLDPE), crosslinked polyethylene (XLPE), and carbon-doped crosslinked polyethylene were obtained. The proximate and ultimate analysis and higher heating value (HHV) of the plastic sample were assessed. The plastic has an HHV of 43.38 MJ/kg, which indicates its good feasibility as a feedstock for energy recovery. Thermal liquefaction experiments were performed in a stainless-steel benchtop reactor (Model 4593, Parr Instrument Company, Moline, IL). In a typical experimental run, 5 g of plastic and 30 ml of solvent were added to the reactor. Different liquefaction methods were used to study the thermal decomposition of the plastic at 350° C. and 90 min reaction duration. Solvent type was shown to have an influence on the degradation of the plastic. For example, acetone treatment achieves the highest conversion rate of 75.34% at 350° C. and 90 min reaction duration, and its products contain 39.33% crude oil, 24.66% solid residue, and 36.01% gas+loss.

Characterization of recovered materials. Gas chromatography-mass spectrometry (GC-MS) analysis of crude oil samples will be performed using a modified Petroleum refinery reformate standard procedure (Corporation, 2010). Agilent 7890 A GC equipped with a ZB-5 ms column (30 m×0.25 mm I.D.×0.25 m film thickness) with 1 uL injections are made split less. The oven program starts at 40° C. and is held for 4 min then ramped at 5° C./min to 110° C., then ramped to 320° C. at 3° C./min. The gas composition is identified by a micro-GC (CP-4900, Varian Inc., US), with thermal conductivity detectors (TCDS). The proximate analysis (volatile matter (VM), ash content (AC), and fixed carbon (FC)) of the SRP plastic sample, char, and crude oil are performed according to ASTM D3172 (D3172-07a, 2013) using the thermogravimetric analysis (TGA). The TGA analysis includes heating ~10 mg of the dry sample from room temperature to 925° C. (heating rate: 20° C./min) under a nitrogen flow rate of 50 ml/min and a purge flow rate of 30 ml/min using NETZSCH TG 209 Libra thermal analyzer (Germany). A bomb calorimeter (Parr Model 6725 Semi-micro calorimeter, Moline, IL) is used to estimate the HHV in MJ/kg. The ultimate analysis of products is done using a Thermo Series II CHNS/O elemental analyzer. Approximately 3-5 mg of the sample is used in the analyzer to measure the carbon (C), hydrogen (H), nitrogen (N), and oxygen (O). Ultra-high-purity gasses (nitrogen, oxygen) are used during the operation of the TGA, the bomb calorimeter, and the CHNS/O elemental analyzer. A dynamic shear rheometer (TA Instrument) will be used to test the rheological properties of oil as well as the elastic modulus and pull-out strength of resulting carbon fibers in the carbon fiber-reinforced polymers.

Figure 1E:
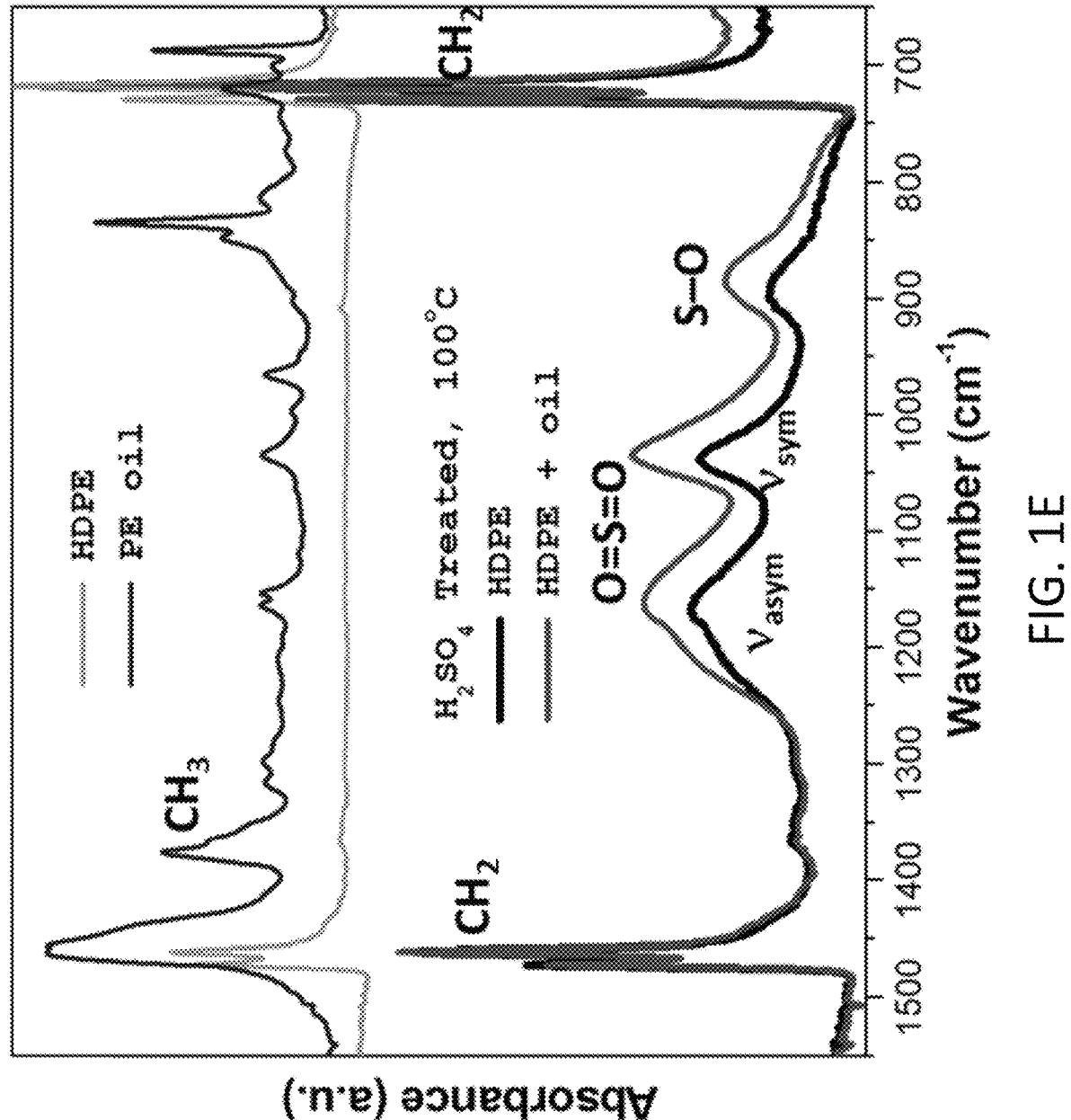
FIG. 1E shows Fourier transform infrared (FTIR) spectra indicating greater sulfonation of HDPE heated after infusion with polyethylene oil compared to HDPE heated without infusion of waste polyethylene oil.

Synthesis of carbon fiber. Pieces of high density polyethylene (HDPE) from a reclaimed milk carton (~0.76 mm thick) were infused with ~10 wt % waste polyethylene oil. The waste polyethylene oil was produced by solvothermal liquefaction of plastics that included linear low-density polyethylene (LLDPE), cross-linked polyethylene (XLPE), and carbon-doped cross-linked polyethylene. The solvothermal liquefaction solvent used was acetone. The polyethylene-infused HDPE samples were immersed in concentrated sulfuric acid and partially sulfonated at 100° C. for 60 min in a microwave reactor. Under these mild reaction conditions, FIGS. 1A-D show that only the HDPE sample treated with polyethylene oil and sulfuric acid turned black. The FTIR spectra shown in FIG. 1E indicate that the sulfuric acid-treated sample infused with waste polyethylene oil had a higher concentration of sulfonate groups compared with the sample that was not infused with waste polyethylene oil. When the four samples in FIGS. 1A-D were carbonized at 800° C. under nitrogen in a thermogravimetric analysis (TGA) instrument, only the acid-treated sample infused with waste polyethylene oil shown in FIG. 1D yielded any residual carbon (0.4 wt %).

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of manufacturing carbon fiber materials, the method comprising:
   combining waste plastic with waste polyethylene oil to yield infused waste plastic;
   combining the infused waste plastic with sulfuric acid to yield a mixture;
   irradiating the mixture with microwave radiation to yield sulfonated waste plastic; and
   carbonizing the sulfonated waste plastic to yield the carbon fiber materials.

2. The method of claim 1, wherein the waste polyethylene oil is chemically heterogeneous.

3. The method of claim 1, wherein the waste polyethylene oil is prepared by solvothermal liquefaction.

4. The method of claim 3, wherein the solvothermal liquefaction comprises:
   combining waste plastic with a solvent to form a mixture; and
   heating the mixture.

5. The method of claim 4, further comprising heating the mixture under pressure in range of about 20 MPa to about 25 MPa.

6. The method of claim 4, wherein the solvent comprises one or more of acetone, alcohol, nitric acid, and water.

7. The method of claim 1, wherein the waste plastic comprises polyolefins.

8. The method of claim 7, wherein the polyolefins comprise high density polyethylene, low density polyethylene, polypropylene, or a combination thereof.

9. The method of claim 1, wherein irradiating the mixture with the microwave radiation comprises heating the mixture to a temperature of at least 100° C.

10. The method of claim 9, wherein irradiating the mixture with the microwave radiation comprises heating the mixture to a temperature in a range between 100° C. and 200° C.

11. The method of claim 10, wherein irradiating the mixture with the microwave radiation comprises heating the mixture to a temperature in a range between 150° C. and 200° C.

12. The method of claim 1, wherein the infused waste plastic comprises between 5 wt % and 15 wt % of the waste polyethylene oil.

13. The method of claim 1, wherein carbonizing the sulfonated waste plastic comprises heating the sulfonated waste plastic to a temperature of at least 750° C.

14. A method of manufacturing carbon fiber materials, the method comprising:

combining waste polyethylene oil with sulfuric acid to yield a mixture;

combining the mixture with waste plastic to yield infused waste plastic;

irradiating the infused waste plastic with microwave radiation to yield sulfonated waste plastic; and carbonizing the sulfonated waste plastic to yield the carbon fiber materials.

15. The method of claim 14, wherein the waste polyethylene oil is chemically heterogeneous.

16. The method of claim 14, wherein the waste polyethylene oil is made by solvothermal liquefaction of waste plastic.

17. The method of claim 14, wherein the waste plastic comprises polyolefins.

18. The method of claim 17, wherein the polyolefins comprise high density polyethylene, low density polyethylene, polypropylene, or a combination thereof.

19. The method of claim 14, wherein irradiating the infused waste plastic with the microwave radiation comprises heating the infused waste plastic to a temperature of at least 100° C.

20. The method of claim 19, wherein irradiating the infused waste plastic with the microwave radiation comprises heating the infused waste plastic to a temperature in a range between 100° C. and 200° C.

21. The method of claim 20, wherein irradiating the infused waste plastic with the microwave radiation comprises heating the infused waste plastic to a temperature in a range between 150° C. and 200° C.

22. The method of claim 14, wherein the infused waste plastic comprises between 5 wt % and 15 wt % of the waste polyethylene oil.

23. The method of claim 14, wherein carbonizing the sulfonated waste plastic comprises heating the sulfonated waste plastic to a temperature of at least 750° C.

* * * * *